United States Patent [19]

Henriksson

[11] Patent Number: 4,897,908
[45] Date of Patent: Feb. 6, 1990

[54] METHOD OF ATTACHING TUBES IN A TUBE PLATE IN A HEAT EXCHANGER

[75] Inventor: Ragnar Henriksson, Linköping, Sweden

[73] Assignee: Asea Stal AB, Sweden

[21] Appl. No.: 713,704

[22] Filed: Mar. 19, 1985

[30] Foreign Application Priority Data

Mar. 20, 1984 [SE] Sweden .............................. 8401533

[51] Int. Cl.⁴ ............................................. B23P 15/26
[52] U.S. Cl. .................................. 29/890.44; 29/445; 29/890.31
[58] Field of Search ................ 165/173, 175; 228/104; 29/157.3 C, 157.3 R, 445, 464, 466, 467

[56] References Cited

U.S. PATENT DOCUMENTS 3,962,767  6/1976  Byerley et al. ................. 29/157.3 C
3,997,193  12/1976  Tsuda ............................... 285/382.4

FOREIGN PATENT DOCUMENTS 2825555  11/1979  Fed. Rep. of Germany ........ 165/70
131308   11/1978  Japan .................................... 165/70
732204   6/1955   United Kingdom .................. 165/70

Primary Examiner—Timothy V. Eley
Attorney, Agent, or Firm—Watson, Cole, Grindle & Watson

[57] ABSTRACT

A method of attaching tubes of high-qualilty material, such as titanium, stainless steel, etc., in a tube plate of a simpler material which is not wherein or substantially not weldable to the tube material, involves attaching sleeves of the same material or substantially the same material as the tubes, to the tubes so that the sleeves extend somewhat beyond the tube plates, whereafter a cover plate, provided with holes therein and being of the same or substantially the same material as the sleeves, is attached to the sleeves ends by means of welding.

11 Claims, 1 Drawing Sheet

METHOD OF ATTACHING TUBES IN A TUBE PLATE IN A HEAT EXCHANGER

BACKGROUND OF THE INVENTION

1. Field of the Invention

The present invention relates to a method of attaching tubes of a first material (typically a high-quality material, such as titanium or stainless steel) in a tube plate of a second material which is not weldable, or substantially not weldable, to the first material.

In heat exchangers and condensers where there are stringent demands for leak tightness in the attachment of the tubes in the tube plates, it is common to carry out such attachments by means of welding. This implies a requirement that there be good weldability between the materials constituting the tubes on the one hand and tube plates on the other hand. In many cases, for example in condensers, a corrosive fluid (i.e. liquid or gas) circulates within the tubes and in such use situations there is much in favour of constructing the tubes and tube plates of the same material, or at least of very closely related materials, to minimize any electropotential differences that arise and thus to reduce the risk of accelerated corrosion occurring.

2. Description of the Prior Art

In the past it has been known to use solid tube plates or tube plates of carbon steel, weld with a suitable corrosion-resistant material, for example with explosion-clad plates of the combination titanium/carbon steel, which are used for condensers with welded-in titanium tubes.

It has been established empirically that tubes of brass or similar material do not meet the requirements for corrosion resistance for, for example, condensers operating with a chemically aggressive cooling water. It may therefore be necessary to replace these tubes with tubes of titanium or tubes of a high-alloy stainless steel (austenitic or ferritic) so that the tubes will better withstand the corrosion. However, using these tubes gives rise to an attachment problem. Cooling water must not leak into the shell side of the condenser or other heat exchanger. This may occur in the case of damage to the tubes or in the case of a leaking tube/tube plate attachment.

In nuclear power plants, there is a stringent demand on a low chloride content in the condensate. Corrosion can be avoided by the use of a high-quality material for the tubes which, because of the cost of the high quality material, are usually made as thin-walled as safety conditions allow. However, it is difficult to attach thin-walled tubes securely enough to meet the high demands for fluid tightness if the tubes are attached merely by rolling them into the tube plate holes, and it is especially difficult to rebuild an old condenser by means of rolling new, high-quality tubes, into existing tube plates.

In copending U.S. patent application Ser. No. 619,366, filed on June 11, 1984, to R. Henriksson (assigned to the assignee of this application), the above-mentioned problems have been solved by a method which involves inserting the tube ends through the tube plates in such a way that each tube end extends somewhat beyond the outside of the respective plate. Thereafter, a cover plate provided with holes and being of the same material (or a similar material) to that of the tubes is laid over the outside of each tube plate and is attached to the tube ends by means of welding. A certain clearance gap might be left between the cover plate and the tube plate, thus providing a space between the two where leakage monitoring can easily be carried out.

However, this method presupposes the existence of projecting tube ends. Problems will arise if condensers and heat exchangers have been re-tubed with tubes of titanium or other corrosion-resistant materials but the original tube plates have to be retained. In this case, corrosion may easily arise in the tube plates. During retubing the new tubes have then usually been machined down so that their free ends are in the plane of the outside of the respective tube plate.

SUMMARY OF THE INVENTION

One object of this invention is to provide a solution to the above-mentioned problems and other related problems. The method according to the invention is characterized in that sleeves of the same material or substantially the same material as the tubes are welded to or expanded into tubes which are rolled or otherwise attached in the tube plates, the sleeves extending somewhat beyond the outside of the plates. Thereafter, a cover plate, provided with holes and being of the same or substantially the same material as the tubes, is attached to the sleeve ends by means of welding.

Thus, the invention provides a fluid-tight transition from tube to sleeve and a suitable location beyond the outer plane of the tube plate for welding a cover plate to the sleeves, the cover plate suitably being of the same or substantially the same material as the tubes. In this way fluid-tight weld joints to each sleeve can be obtained. A gap can be left between the cover plate and the tube plate and means provided in the gap to monitor for fluid leakage at the joints between the cover plate and the sleeves/tubes.

BRIEF DESCRIPTION OF THE DRAWING

The invention will be exemplified, by way of example, in greater detail with reference to the accompanying drawing, in which:

FIG. 1 shows a tube 5, rolled into a hole in a tube plate 6. The tube plate 6 may, for example, be made of brass and the tube 5 is made of a high-quality material such as titanium or stainless steel which is normally not weldable to the material of the tube plate. The tube terminates at 5a in the outer plate of the tube plate 6. Problems may arise in a condenser or heat exchanger by leakage in rolled-in tubes as a result of corrosion in the tube plate or the existence of an unsuitable material combination at the rolled joint. It is necessary to lengthen the tubes somewhat beyond the outside surface of the tube plate 6, which can be done by the method of the invention, for example, as shown in FIG. 2.

DESCRIPTION OF THE PREFERRED EMBODIMENTS

Figure 1:
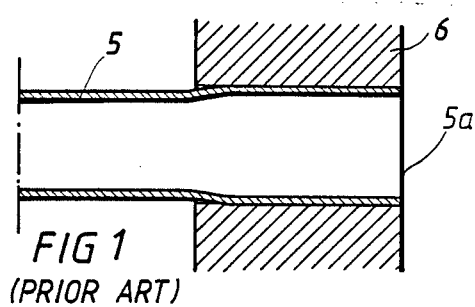
FIG. 1 shows a section through part of a tube plate and a tube end fixed therein in a prior art conventional tube attachment.
Figure 2:
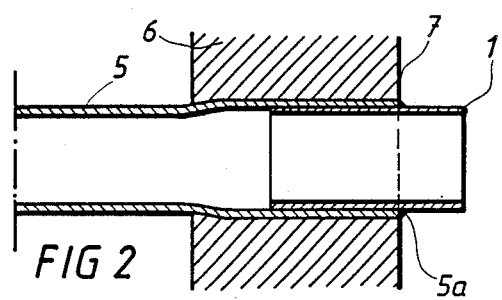
FIG. 2 shows, in accordance with the invention, a sleeve expanded inside the tube end of FIG. 1.

FIG. 2 shows one way in which each tube 5 can be lengthened usually at both ends, although only one end is shown, so as to extend somewhat outside the plane 7 of the tube plate 6, for example about 6 mm outside. A tube sleeve 1 of the same or a similar material to that used for the tube 5 is arranged in the tube, and this sleeve 1 is expanded to bind firmly within the end of the tube 5 adjacent to its end 5a. Since the tubes 5 and the tube sleeves 1 in most cases are made of a very corrosion-resistant material, the tube sleeves 1 can be expected to be made so thin-walled that problems associated with an obstruction of the tube bore (e.g. cleaning problems) will not arise. This procedure can be repeated for all the tube ends in the tube plates.

Figure 4:
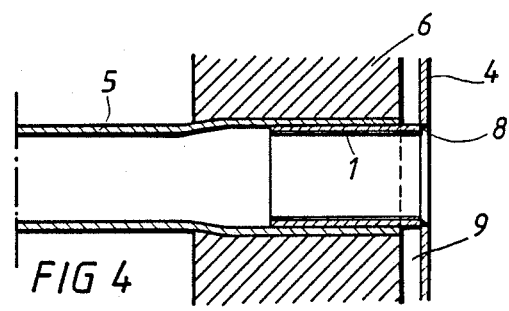
FIG. 4 shows a sleeve welded to a cover plate in front of the tube plate of FIG. 1.

FIG. 4 shows how an apertured cover plate 4, of the same or substantially the same material as the sleeve 1 and the tube 5 is welded at 8 to the end of the sleeve 1, thus creating a gap 9 between the cover plate 4 and the tube plate 6. Leakage of various kinds can be readily continuously indicated and monitored in this gap 9. After welding each tube sleeve 1 into a hole in the cover plate 4, the creation of fluid-tight joints between the tubes and the tube plate should have been effected.

Should a leakage of cooling water occur through the joint between the tube sleeve 1 and the tube 5, the cooling water will enter the gap 9 between the tube plate 6 and the cover plate 4. Therefore, the construction should suitably include some kind of leakage monitoring system, for example a system as shown in the above mentioned U.S. application Ser. No. 619,366, the entire disclosure of which is herein incorporated by reference.

Figure 3A:
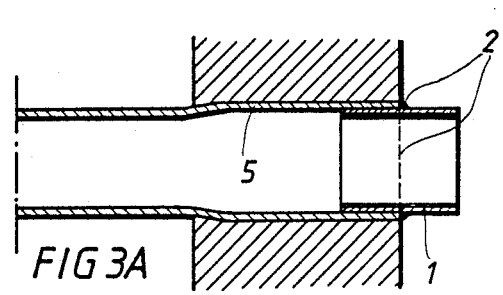
FIGS. 3A and 3B show the arrangement of FIG. 1 with two types of welds between the sleeve and the tube.
Figure 3B:
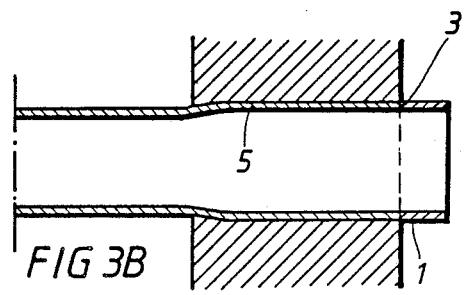

FIG. 3A shows the sleeve 1 attached to the tube 5 by means of a fillet at the inner or outer end of the sleeve weld 2, and FIG. 3B shows the sleeve 1 attached to the end of the tube 5 by means of a butt weld 3 located at the plane of the outside surface of the tube plate 6. In both these types of joint, a cover plate 4 would subsequently be welded to the sleeve ends, to again leave a gap 9 as shown in FIG. 4.

In the same way as is shown in the above-mentioned U.S. patent application Ser. No. 619,366, the holes in the cover plate 4 may be made under-sized and then broached to the actual hole positions in the tube plates 6 so that suitable positional accuracy and a correct clearance is obtained to each tube end thus facilitating accurate welding.

The method described above with reference to the drawing can be varied in many ways within the scope of the following claims.

What is claimed is:

1. A method of attaching an end of a tube of a first material of high chemical corrosion resistance to a tube plate of a second material of lower chemical corrosion resistance, said second material being at best substantially not weldable to said first material, the tube plate having an inner surface, an outer surface and a hole therethrough and the end of said tube extending through the hole in said tube plate so as to extend from the inner surface thereof to the outer surface thereof, said method including the steps of
   attaching a sleeve of at least substantially the same material as said first material to said end of the tube so that said sleeve extends away from the outer surface of said tube plate, said sleeve having a bore therethrough in fluid communication with the interior of said tube,
   placing a cover plate of at least substantially the same material as said first material a distance away from the outer surface of said tube plate so as to leave a space between said cover plate and said tube plate, said cover plate having a hole therein which is aligned with the bore in said sleeve, and
   welding said sleeve to the cover plate to provide a fluid-tight joint therebetween.

2. A method according to claim 1, in which the cover plate is spaced from the tube plate to leave a certain clearance between the cover plate and the tube plate, which clearance is bridged by said sleeve.

3. A method according to claim 1, in which the sleeve is inserted somewhat into said end of the tube and the sleeve is welded to the tube.

4. A method according to claim 2, in which the sleeve is inserted somewhat into said end of the tube and the sleeve is welded to the tube.

5. A method according to claim 2, in which the sleeve is butt welded to the end of the tube.

6. A method according to claim 2, in which the sleeve is expanded into the tube.

7. A method according to claim 1, in which the sleeve is butt welded to the end of the tube.

8. A method according to claim 5, in which the butt weld is located substantially in the plane of the outer surface of the tube plate.

9. A method according to claim 1, in which said first material is selected from the group consisting of titanium, austenitic stainless steel and ferritic stainless steel.

10. A method according to claim 1, in which the sleeve is expanded into the tube.

11. A method according to claim 1, in which said first material contains titanium and said second material is carbon steel.

* * * * *